(12) United States Patent
Zinnbauer et al.

(10) Patent No.: US 10,479,450 B2
(45) Date of Patent: Nov. 19, 2019

(54) DOUBLE SEAL KAYAK HATCH

(71) Applicant: Bright Plastics, Greensboro, NC (US)

(72) Inventors: Gerald Boyd Zinnbauer, Cornelius, NC (US); John Martin Schaefer, Greensboro, NC (US); Lee Patrick Ward, Gaffney, SC (US)

(*) Notice: Subject to any disclaimer, the term of this patent is extended or adjusted under 35 U.S.C. 154(b) by 0 days.

(21) Appl. No.: 14/659,551

(22) Filed: Mar. 16, 2015

(65) Prior Publication Data
US 2015/0259039 A1 Sep. 17, 2015

Related U.S. Application Data

(60) Provisional application No. 61/967,272, filed on Mar. 14, 2014.

(51) Int. Cl.
B63B 19/26 (2006.01)
B63B 19/14 (2006.01)
B29C 45/16 (2006.01)
B29L 31/26 (2006.01)
B29K 101/12 (2006.01)
B63B 35/71 (2006.01)

(52) U.S. Cl.
CPC .......... *B63B 19/14* (2013.01); *B29C 45/1615* (2013.01); *B29C 45/1671* (2013.01); *B29C 2045/1673* (2013.01); *B29K 2101/12* (2013.01); *B29K 2995/0046* (2013.01); *B29K 2995/0082* (2013.01); *B29L 2031/265* (2013.01); *B63B 2035/715* (2013.01)

(58) Field of Classification Search
CPC .... B63B 19/14; B63B 2035/715; B63B 19/26
See application file for complete search history.

(56) References Cited

U.S. PATENT DOCUMENTS 2,847,837 A * 8/1958 Baker ..................... F16D 3/848
277/507
4,241,686 A * 12/1980 Westphalen .............. B60F 3/00
440/111

* cited by examiner

*Primary Examiner* — Stephen P Avila
(74) *Attorney, Agent, or Firm* — Trego, Hines & Ladenheim, PLLC; Jonathan Hines; Thomas McClure

(57) ABSTRACT

The present invention provides a sealing device for an opening. The device includes a body that has a first side and a second side. A passageway is formed through the body such that the passageway has a first end adjacent to the first side and a second end that is adjacent to the second side. A sealing member is provided that includes an outer gasket and an inner gasket. The outer gasket is positioned adjacent the first side and the inner gasket is positioned adjacent the second side. A seal connector connects the inner gasket and the outer gasket and the seal connector passes through the passageway. In this way, the inner gasket and the outer gasket are mechanically attached to the ring. The sealing device is configured for use in such applications as sealing the cargo opening on the deck of a kayak.

9 Claims, 5 Drawing Sheets

DOUBLE SEAL KAYAK HATCH

PRIORITY

This is a non-provisional United States patent application that claims priority from U.S. provisional application No. 61/967,272 that was filed on Mar. 14, 2014; and which is incorporated by reference herein in its entirety.

FIELD OF THE INVENTION

The invention relates generally to a sealing system to a cargo area and more specifically to a system for sealing, i.e. providing a hatch for, a cargo area of a kayak.

BACKGROUND OF THE INVENTION

The watercraft market has seen a significant growth over the last decade. In particular, in more recent times the growth of kayak (sometimes spelled: kayak) sales has spiked dramatically. Along with this growth, the competition for sales has generated new and better vessels. While these vessels generate large sales dollars, they can also create substantial costs. In some cases, much of the costs are associated with production of the tools to create new and improved features on these vessels.

Features are very important in the kayak industry. However, unlike other industries, the focus for product development is function first, aesthetics second. One of the functions that is often addressed is keeping the storage compartments of the vessel dry. One problem with conventional kayaks is that it has always been a challenge to keep various zones of the boat dry. As a result, great effort and dollars have been expended on seals and gaskets for hatches. Stretchable, rubber-like designs, o-rings, and die cut sealing materials are but some of the conventional methods to seal cargo areas. One problem with these conventional methods is that they do not operate consistently. In this regard, stretchable, rubber-like designs, o-rings, and die cut sealing materials have a tendency to shift and change shape. A conventional method for maintaining seal position is to glue the seals to a supporting structure or body or the deck. But seals can move even when glue is used to affix them to the hatch body or deck.

The present invention provides a means for insuring consistent dimensional stability at a reasonable cost by employing a new and unique manufacturing method.

SUMMARY OF THE INVENTION

The present invention provides a sealing system that addresses the above problems by providing a main body that has a seal surrounding it for contacting a deck and a cover that contacts a second seal. The positions of the surrounding seal and the second seal relative to each other and to the main body are maintained by connectors that extend through the body between the two seals. In this way the seals are mechanically linked to the body such that the seals are resistant to deformation and shifting.

According to one embodiment of the present invention, there is provided a sealing device for an opening. The device includes a body that has a first side and a second side. At least one hole is formed through the body such that the at least one hole has a first end adjacent to the first side and a second end that is adjacent to the second side. A seal set that includes an outer seal, an inner seal, and at least one bridge is positioned such that the outer seal is positioned adjacent the first side and the inner seal is positioned adjacent the second side. The outer seal is connected to the inner seal by the at least one bridge that extends from the outer seal through the hole to the inner seal.

According to one aspect of the present invention, the body is formed of a first material and the seal set is formed of a second material and the first material is stiffer than the second material.

According to another aspect of the present invention, the device also includes a flange that defines at least a portion of the first surface, and an outer wall that extends away from the flange and defines at least a portion of the second surface.

According to another aspect of the present invention, a bottom wall and an inner wall that together with the outer wall define a channel.

According to another aspect of the present invention, the body is a ring.

According to another aspect of the present invention, the outer gasket is attached to the flange and the inner gasket is attached to the channel.

According to another aspect of the present invention, the device also includes a cover that is configured to engage the ring such that a portion of the cover depresses a portion of the inner gasket.

According to another embodiment of the present invention, there is provided a hatch system that includes a ring, an outer seal, and an inner seal. The ring defines an outer surface and an inner surface. The outer seal is attached to the outer surface and an inner seal is attached to the inner surface. At least one passageway is defined through the ring from a first end adjacent to the outer surface to a second end that is adjacent to the second surface. A cover is configured to engage the ring such that the cover is sealingly engaged with the inner seal. A connector extends through each passageway such that the connector is joined to the outer seal and the connector is joined to the inner seal.

According to one aspect of the present invention, the outer seal, the inner seal, and the connector are composed of a first material and the ring is composed of a second material and the second material is stiffer than the first material.

According to another aspect of the present invention, the system also includes a flange that defines at least a portion of the outer surface. And an outer wall that extends away from the flange and defines at least a portion of the second sealing surface.

According to another aspect of the present invention, a bottom wall, an inner wall and the outer wall define a channel.

According to another aspect of the present invention, the outer seal is attached to the flange and the inner seal is attached to the channel.

According to another aspect of the present invention, the ring is attached to a boat.

According to another aspect of the present invention, the boat includes a deck that has an opening formed in it and the ring is positioned near the opening such that an upper surface of the deck is separated by the ring and the cover from a lower surface of the deck.

According to another aspect of the present invention, a portion of the ring extends into the opening.

According to another aspect of the present invention, a portion the ring extends over the surface of the deck around the opening.

According to another aspect of the present invention, the boat is a kayak.

According to another embodiment of the present invention, there is provided a device for providing flexible surfaces for sealing openings, the device produced by a method that includes the following steps: A) providing a first mold that defines a first space of predetermined first shape; B) introducing a first material that has a predetermined stiffness when cured into the first space to form a body that has the predetermined first shape which includes a passageway that has a first end on a first side of the body and second end on a second side of the body; C) removing the body from the first mold; D) providing a second mold that defines a second space that has a second predetermined shape; E) introducing the body into the second space such that a third space that has a third predetermined shape is defined by the body and the second mold; F) introducing a second material that when cured, is less stiff then the first material when cured, such that the second material passes through the passageway; F) connecting the first side of the body to the second side of the body with the second material; and G) removing the second mold to provide a sealing ring.

According to another aspect of the present invention, the method for producing the device including the further step of attaching the sealing ring to a deck that has an upper surface and a lower surface such that the sealing ring is near an opening formed through the deck such that the upper surface is fluidly connected to the lower surface.

According to another aspect of the present invention, the method for producing the device including the further step of providing a hatch configured to sealingly engage with the ring such that the upper surface of the deck is not fluidly connected to the lower surface of the deck.

BRIEF DESCRIPTION OF THE DRAWINGS

For a fuller understanding of the nature and objects of the present invention, reference should be made to the following detailed description taken in connection with the accompanying drawings, wherein.

DETAILED DESCRIPTION OF THE PREFERRED EMBODIMENTS

Figure 1:
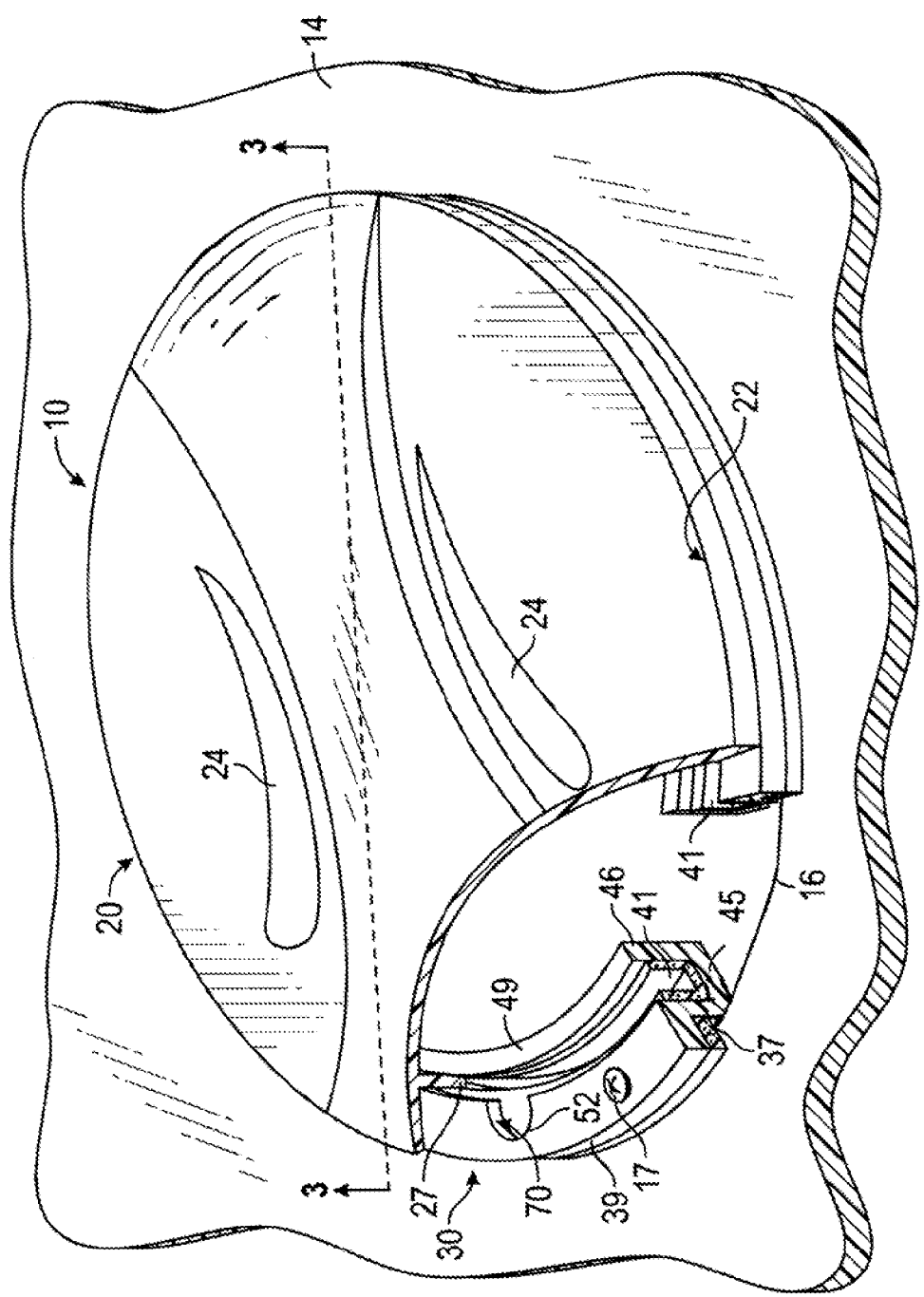
FIG. 1 is a perspective view of a hatch system according to one embodiment of the present invention where the hatch system is positioned on a portion of a deck and the view includes partial cutaways of the cover to show a body for supporting seals that is in the form of a ring with seals and to show the positional relationship of the ring and seals.

Embodiments of the present invention are directed to a hatch system 10, in which a removable hatch cover 20 and a sealing ring body 30 is provided. In the illustrated embodiment, sealing ring 30 is configured to engage a deck 14 of a boat (now shown) such that an opening 16 within deck 14 is sealed by ring body 30 and cover 20.

Figure 2:
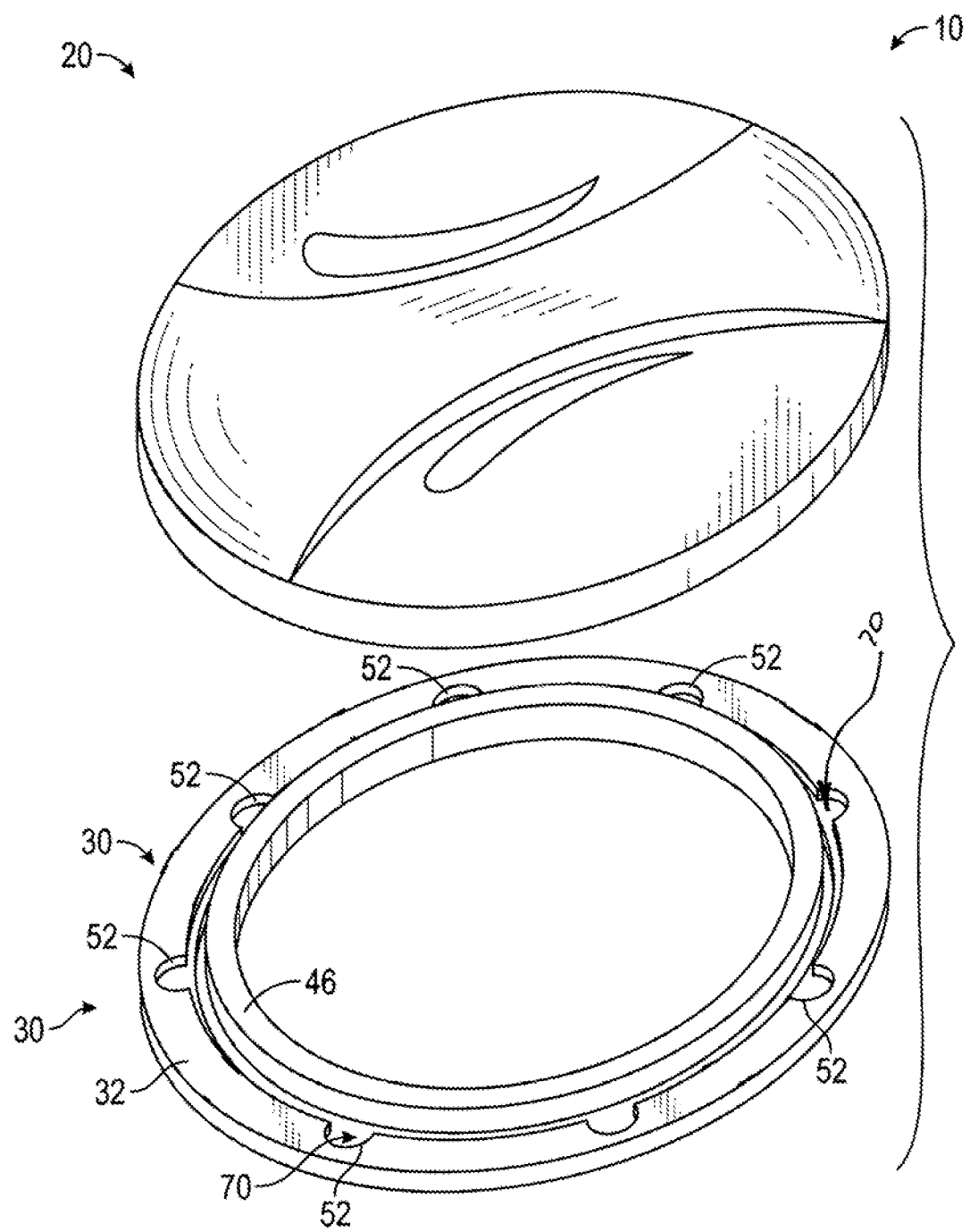
FIG. 2 is an exploded perspective view of the embodiment of the invention shown in FIG. 1.

Referring to FIGS. 1 and 2, in accordance with an embodiment of the invention, a hatch system 10 for sealing a cargo opening 16 in a deck 14 includes a cover 20, a ring body 30, and a seal set 70. In the illustrated embodiment cover 20 and body 30 are generally round but it should be appreciated that they can be some other suitable shape as well. Cover 20 includes a shell 22 that extends to an outer rim 26. A hatch wall 27 extends from shell 22 near the outer rim 26 of cover 20. Cover 20 also includes a means for engaging ring 30. In the illustrated embodiment, means for engaging ring 30 includes a closure actuator 24 positioned on shell 22 and mechanical fasteners 25. In the illustrated embodiment, actuator 24 and mechanical fasteners 25 are part of a cam arm locking system. By way of example and not limitation, the means for engaging ring 30 can include the following: threaded closures, snap-fit closures, interlocking tabs, a hinge and clasp system, and a combination thereof. Outer rim 26 defines an outer rim surface 28 and hatch wall 27 defines a sealing ridge tip end 29 for engaging with seal set 70 as will be discussed further below.

Figure 3:
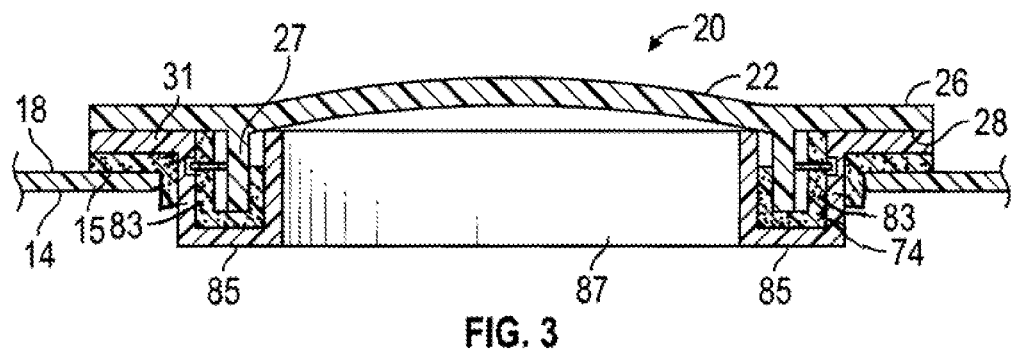
FIG. 3 is a sectional view of the embodiment of the invention shown in FIG. 1 taken along line 3-3.
Figure 4:
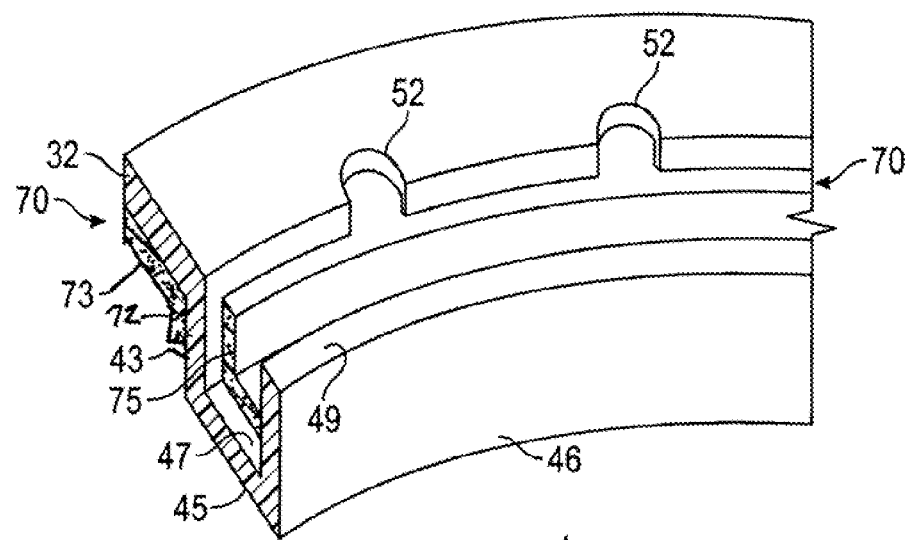
FIG. 4 shows a portion of a section of a perspective view of the ring body according to one embodiment of the present invention showing the flange and channel of the ring and the outer and inner seals that are connected through holes formed in the ring body.

Continuing to refer to FIG. 1, seal ring 30 has at least one fastener indents 31 defined therein that are each configured to receive a corresponding mechanical fastener 25. Extending from sealing ring 30 is a flange 32. Flange 32 defines an outside land area 34. Flange 32 also defines a flange deckside surface 37 and an outer edge 39. As seen in FIGS. 1, 3 and 4 sealing ring 30 also includes an annular channel 41. Annular channel 41 includes an outer wall 43, a channel bottom 45, and an inner wall 46. Together, outer wall 43, bottom wall 45, and inner wall 46 define a channel surface 47. Inner all 46 extends upward from bottom wall 45 to define an inner land area 49.

Figure 5:
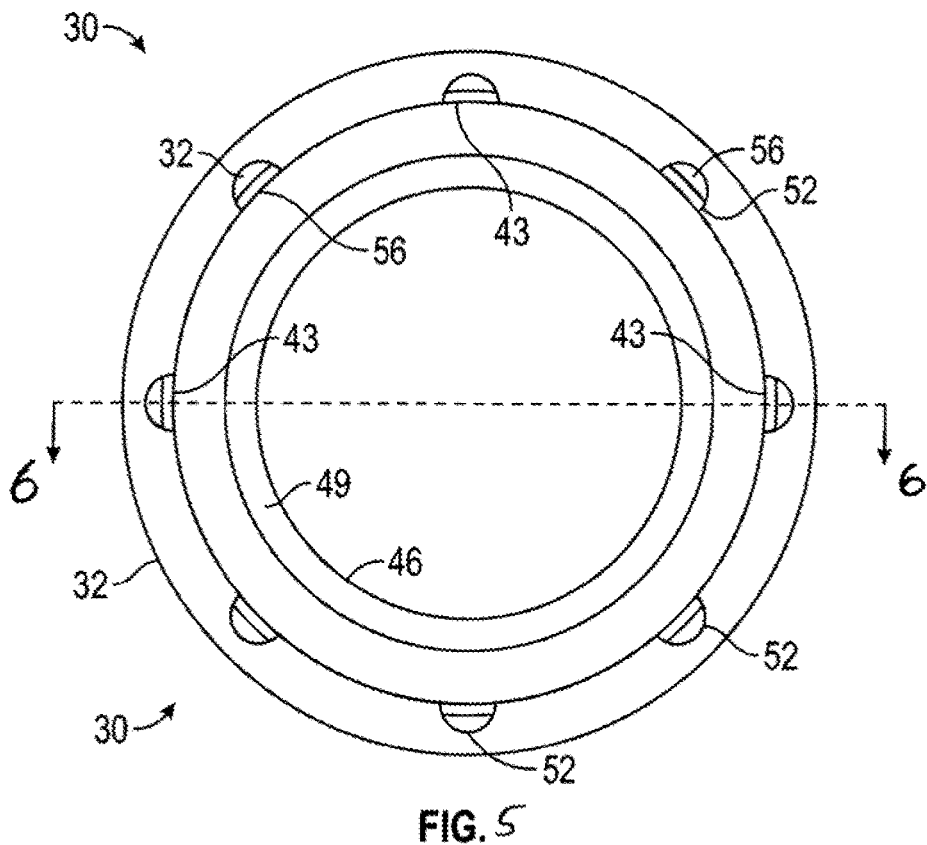
FIG. 5 is a plane view of one embodiment of the present invention showing the ring without seals.
Figure 6:
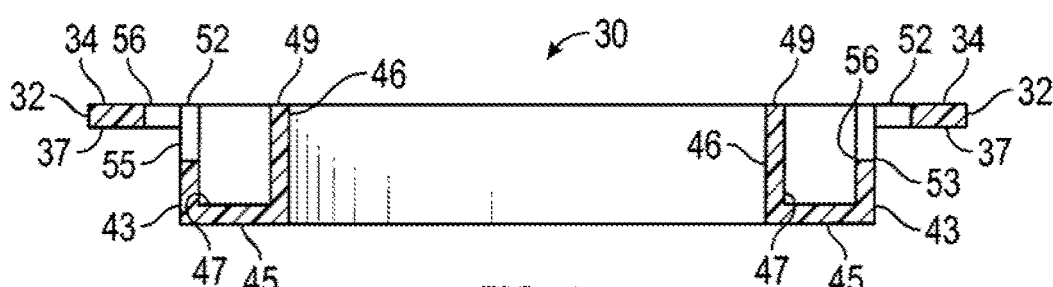
FIG. 6 is a cross sectional side view of the ring shown in FIG. 5 taken along line 6-6.
Figure 7:
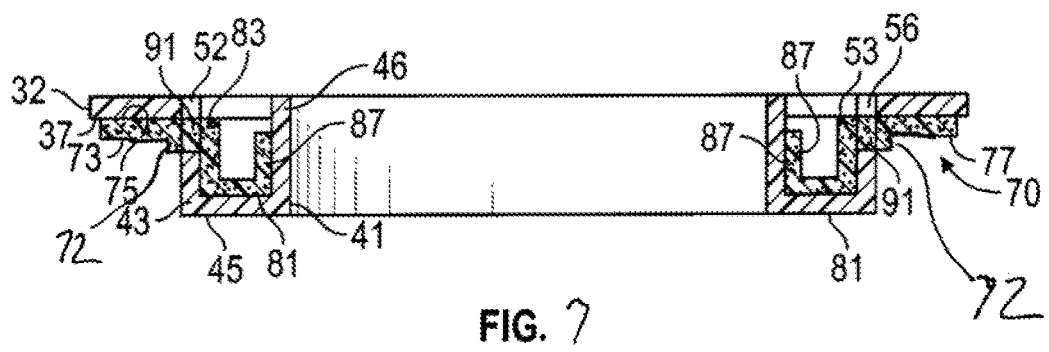
FIG. 7 shows a cross-sectional side view of the ring shown in FIG. 6 taken along line 6-6 also showing the position of the outer seal, the inner seal and seal connectors.

As seen in FIGS. 5, 6, and 7, a plurality of ports are defined through ring body 30 in the form of holes 52. Each hole 52 extend from a first side opening 53 to a second side opening 56. Each opening 53 is adjacent to deckside surface 37 and opening 56 is adjacent to channel surface 47. Stated another way, each hole 52 runs through body ring 30 from the deckside surface 37 to channel surface 47.

Referring now to FIGS. 5-8, seal set 70 includes an outer seal 73 and an inner hatch seal 81. Outer flange seal 73 is positioned adjacent the deckside surface 37 of ring 30. Inner seal 81 is positioned adjacent channel surface 47. In the illustrated embodiment, seal set 70 includes a plurality of connector bridges 91 connect outer seal 73 to inner seal 81. Each connector bridge 91 extends through a hole 52 from outer seal 73 to inner seal 81. In this manner, outer seal 73 is mechanically locked to ring body 30 and inner seal 81 is locked to ring body 30.

Outer seal 73 has a vertical seal portion 72 at is configured to engage an edge of opening 16 and outer wall 43 of ring 30. In this manner, the outside of ring 30 is sealed from water on deck 14 even if flange 32 is not positioned such that outer seal 73 is sealingly compressed against deck 14. It should be appreciated that in some embodiments Outer seal 73 does not include a vertical portion 72 and only seals between flange 32 and deck 14 and in other embodiments vertical portion 72 is the only seal provide between ring 30 and the deck.

Continuing to refer to FIGS. 5-8, outer seal 73 defines a flange surface 75 which is configured to contact deckside surface 37 of ring 30. Outer seal 73 also defines a deck surface 77 that is configured to contact deck 14. Inner hatch seal 81 is positioned within channel 41 and includes a hatch seal outer wall 83, a hatch seal bottom 85, and a hatch seal inner wall 87. Inner hatch seal 81 is adjacent annular channel surface 47. Thus inner hatch seal 81 and outer seal 73 are positioned against opposite sides of ring 30.

In the illustrated embodiment, body 30 is formed of a generally rigid material such as glass or talc filled polypropylene, acrylonitrile butadiene styrene (ABS), polycarbonate, or the like. The rigid materials of body 30 cannot, on their own, seal off against the intrusion of water. Therefore seal set 30 is formed of flexible materials. In the illustrated embodiment, seal set 30 is formed of a synthetic rubber thermoplastic polymer (TPE). By way of example and not limitation, seal set 30 can be formed of one of the following: Polyethylene, urethane, rubberized polypropylene and a combination thereof.

Referring to FIGS. 1 and 3, in use, hatch system 30 is attached to deck 14 by fasteners 17. Fasteners 17 are configured to compress seal set 70 between the deck and components of hatch system 10. More specifically outer seal 73 is compressed between flange 32 and deck 14 thus sealing any gaps that might otherwise exist between flange surface 37 and deck surface 18. Inner seal 73 is compressed such that gaps between cover 20 and channel 41 are sealed when cover 20 is moved toward ring 30 by operation of closure actuator 24 and mechanical fastener 25.

Ring 30 is secured to deck 14 by a plurality of fastening means 17. In the illustrated embodiment, the fastening means is a screw. By way of example and not limitation, the fastening means can include one of the following: a bolt and nut, bolts with cam locks, a tab and slot system, a threaded closure system, and a combination thereof.

Referring now to the operation of the cover, tip 29 of hatch wall 27 is configured to engage and compress hatch seal bottom 85. Inner contact surface 23 of hatch wall 27 is configured to engage and compress hatch seal inner wall 87. It is believed that this double sealing configuration provides a robust closure that will resist leaks even when rugged use or improper closure causes tip 29 not to be firmly engaged with hatch wall 27.

Figure 9:
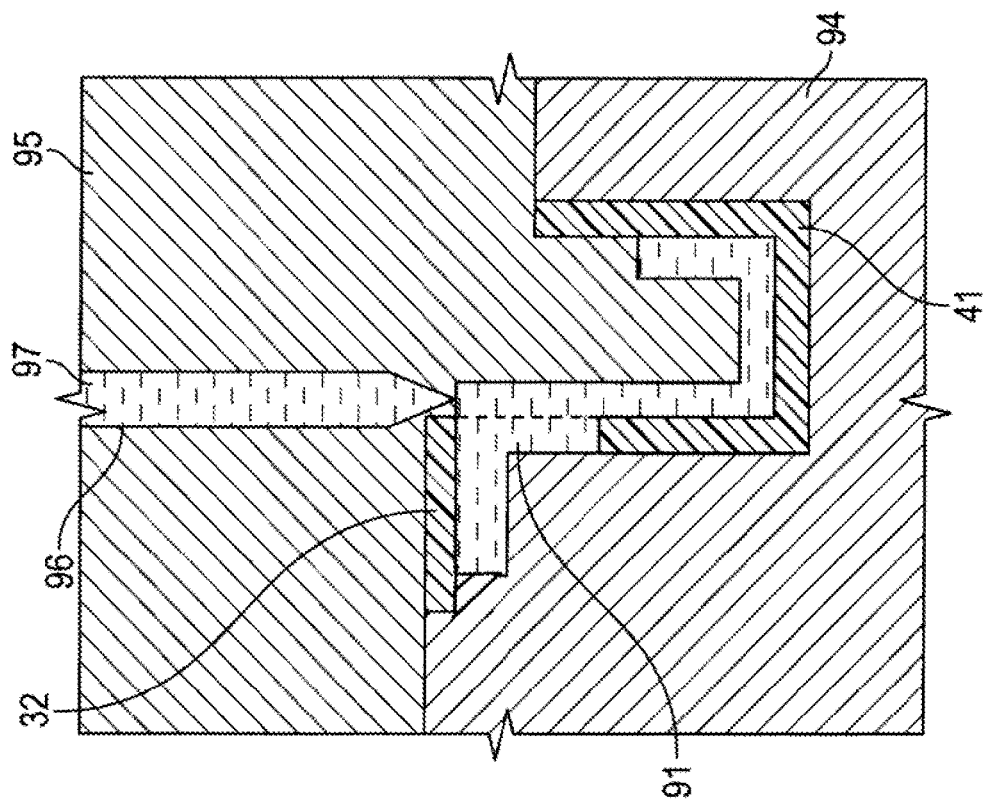
FIG. 9 shows a portion of a second mold for molding a seal set according to the present invention wherein the ring body is positioned within voids defined within the second mold.
Figure 8:
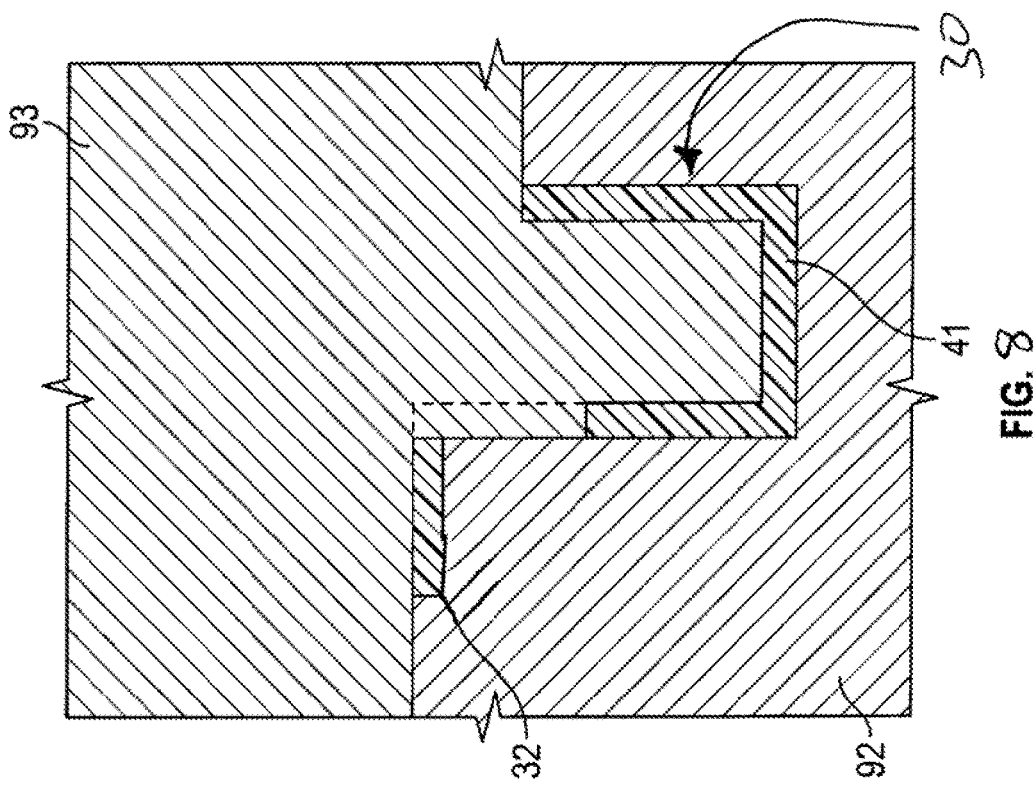
FIG. 8 shows a portion of a first mold for molding a ring body according to the present invention.

The present invention can be better understood by a description of the manufacture thereof which results in the seal set 70 being mechanically attached to the ring 30. Primary parts of hatch system 10 are injected molded of a generally rigid material as indicated above. The process of injecting melted plastic material between metal dies that have specific gaps between the metal portions is called injection molding. Referring now to FIGS. 9 and 10, dies are provided to mold hatch system 10 in two steps. Ring 30 is molded in the first step and a sealing ring mold first block 92 is configured to be joined to sealing ring mold second block 93 such that voids are defined by mold block 92 and mold block 93 that defines the shape of ring 30. As shown in FIG. 9, in one embodiment, flange 32 includes a downward lip 33 that is configured to further retain outer seal 73 of seal set 70 in position. In an additional molding step, sealing set 70 is added to ring body 30 by the process of overmolding. In this process ring 30 formed in the first molding step is placed in the second mold, for the seal set, as defined by seal set mold first block 94 and seal set mold second block 95 and the liquid material 97 for seal set 70 is introduced. The liquid material is allowed to flow through holes 52 to form seal connectors 91, outer seal 73 and inner seal 74 such that outer seal 73 and inner seal 74 are mechanically locked together by connectors 91. In addition seal set 70 is adhered to ring 30 by the process of overmolding.

In more detail, ring 30 and seal set 70 are produced by a method that includes the following steps: A) providing a first mold made up of seal set mold first block 94 and seal set mold second block 95 that defines a first space of predetermined first shape; B) introducing a first material that has a predetermined stiffness when cured into the first space to form ring body 30 that has the predetermined first shape which includes a passageway or hole 52 that has a first end on a first side of ring body 30 and a second end on a second side of ring body 30; C) removing ring body 30 from the first mold; D) providing a second, gasket or seal set, mold that defines a second space that has a second predetermined shape; E) introducing ring 30 into the second space such that a third space that has a third predetermined shape equivalent to seal set 70 is defined by body 30 and the second mold; F) introducing a second material that when cured, is less stiff then the first material when cured, such that the second material passes through the passageway, hole 52; F) connecting the first side of the body to the second side of the body with the second material via seal connector 91; and G) removing the second mold to provide a sealing ring.

The method for producing the device including the further step of attaching sealing ring 30 to deck 14 that has an upper surface and a lower surface such that the sealing ring is near opening 15 that is formed through deck 14 such that the upper surface is fluidly connected to the lower surface.

According to another aspect of the present invention, the method for producing the device including the further step of providing a hatch or cover 20 configured to sealingly engage with ring 30 such that the upper surface of deck 14 is not fluidly connected to the lower surface of deck 14.

The invention is applicable to any type of water tight closure that requires sealing surfaces that are resistant to shifting and movement such that the sealing surfaces remain properly aligned. While the present invention has been illustrated and described with reference to preferred embodiments thereof, it will be apparent to those skilled in the art that modifications can be made and the Invention can be practiced in other environments without departing from the spirit and scope of the invention, set forth in the accompanying claims.

Having described the invention, the following is claimed:

1. A hatch system for a kayak, the hatch system comprising:
   a ring that defines an outer surface and an inner surface;
   an outer seal is attached to the outer surface;
   and an inner seal is attached to the inner surface;
   at least one passageway is defined through the ring from a first end adjacent to the outer surface to a second end that is adjacent to the inner surface;
   a cover is configured to engage the ring such that the cover is sealing y engaged with the inner seal;
   a connector extends through each passageway such that he connector is joined to the outer seal and the connector is joined to the inner seal;
   a channel defined by the ring such that the channel walls define the inner surface; and
   wherein the cover includes a hatch wall and the channel is configured to receive the hatch wall and the inner seal such that the inner seal is positioned between a tip of the hatch wall and a bottom surface of the channel.

2. A hatch system according to 1, wherein the outer seal, the inner seal, and the connector are comprised of a first material and the ring is comprised a second material and the second material is stiffer than the first material.

3. A hatch system according to claim 2, the system u her comprising:

a flange that defines at least a portion of the outer surface of the ring; and an outer wall that extends away from the flange and defines at least a portion of the inner sealing surface on one side and at least a portion of the outer surface on an opposing side.

4. A hatch system according to claim 3, wherein the outer seal is attached to the flange and the inner seal is attached to the channel and the inner seal includes a hatch seal outer wall and a hatch seal inner wall that are spaced-apart and substantially parallel to each other.

5. A hatch system according to claim 2, wherein the ring is attached to a kayak.

6. A hatch system according claim 5 wherein the boat includes a deck that has an opening formed in it and the ring is positioned near the opening.

7. A hatch system according to claim 6, wherein a portion of the ring extends into the opening.

8. A hatch system according to claim 6, wherein a portion of the ring extends over the surface of he deck around the opening.

9. A hatch system according to claim 6, wherein the boat is a kayak.

\* \* \* \* \*